United States Patent
Wojciechowski et al.

(10) Patent No.: US 6,352,385 B1
(45) Date of Patent: Mar. 5, 2002

(54) MECHANICAL COUPLING FOR COOPERATING ROTATABLE MEMBERS

(75) Inventors: Charles Robert Wojciechowski, West Chester; Gary Mac Holloway, Cincinnati; Richard Clay Haubert, Hamilton, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/629,538

(22) Filed: Jul. 31, 2000

(51) Int. Cl.[7] .................................................. F16D 1/00
(52) U.S. Cl. .................... 403/404; 403/364; 415/216.1; 416/244 A
(58) Field of Search ................................ 403/364, 375, 403/359.1, 404, 335, 336, 337; 416/244 A, 230, 241 A, 229 A; 415/216.1; 464/181, 157

(56) References Cited

U.S. PATENT DOCUMENTS

| | | | | |
|---|---|---|---|---|
| 2,303,031 A | * | 11/1942 | Dusevoir | 403/364 |
| 2,429,284 A | * | 10/1947 | Wildhaber | 403/364 X |
| 4,053,248 A | * | 10/1977 | Schultenkamper et al. | 403/337 |
| 4,123,199 A | * | 10/1978 | Shimizu et al. | 416/244 A |
| 4,792,320 A | * | 12/1988 | Nickel | 464/181 |
| 5,851,152 A | * | 12/1998 | Ilzhofer et al. | 464/181 |
| 6,210,283 B1 | * | 4/2001 | Wojciechowski et al. | 464/181 |

* cited by examiner

*Primary Examiner*—Harry C. Kim
(74) *Attorney, Agent, or Firm*—Andrew C. Hess; Rodney M. Young

(57) ABSTRACT

A mechanical coupling to transfer torque between cooperating rotatable members each of substantially circular cross section and aligned along an axis of rotation comprises first and second members including, respectively, first and second surface portions in juxtaposition across an interface. Each surface portion includes a plurality of spaced apart teeth mechanically interlocking at the interface. The first surface portion comprises a fiber reinforced material including fibers oriented within about 45°, on either side, of an axis of rotation. Provided is a clamp to hold the first and second surface portions together at the interface.

9 Claims, 3 Drawing Sheets

MECHANICAL COUPLING FOR COOPERATING ROTATABLE MEMBERS

The Government has rights in this invention pursuant to Contract No. F33615-94-2-4439 awarded by the Department of the Air Force.

BACKGROUND OF THE INVENTION

This invention relates to a coupling between a plurality of rotatable members of generally circular cross section. More particularly in one form, it relates to a coupling between aligned, co-operating members of a shaft.

In rotating apparatus, for example shafts, drums, etc. in power generation machinery such as a turbine engine, it can be desirable to join cooperating, rotating members of dissimilar materials, metals or alloys. Examples of such rotating members include shafts, drums, conical structures, etc., designed in various forms within a gas turbine engine. A variety of reported methods for bonding such dissimilar metals and alloys include diffusion bonding, conventional welding, friction welding, brazing, and explosive bonding, depending on such conditions as the intended operating temperature of a component being formed and the mechanical properties required in the joint between such members. When significant differences exist in properties, such as in strength, thermal expansion, etc., transition metals or metal alloys have been bonded between members.

In modern gas turbine engines, it can be beneficial, for example for weight reduction, to use for a rotating component, such as a shaft, a combination of a metal or metal alloy member and a fiber-reinforced member, such as a metal matrix composite, carried together for rotation. One example of such a composite known in the art includes a matrix based on Ti or an alloy of Ti, reinforced with fibers, for example glass, graphite, carbon, polymer, metal, etc. Bonding, such as the types identified above, does not provide adequate mechanical and/or physical properties to a joint between such members of significant differences in thermal expansion characteristics. Such bonding particularly is a problem when it is intended to transfer torque between such cooperating, dissimilar members during rotation.

BRIEF SUMMARY OF THE INVENTION

The present invention, in one embodiment, provides a mechanical coupling to transfer torque between cooperating rotatable members, each of substantially circular cross section and aligned along an axis of rotation. The coupling as a combination comprises a first member having a first surface portion of a fiber reinforced composite material including fibers oriented predominantly within about 45°, on either side, of the axis of rotation. The first surface portion includes a first plurality of spaced-apart teeth projecting from the first surface portion, in one form generally axially and disposed generally circumferentially about the first member.

The coupling comprises a second member having a second surface portion including a second plurality of spaced-apart teeth projecting from the second surface portion toward the first plurality of teeth, in one form generally axially and disposed generally circumferentially about the second member. The first and second plurality of teeth cooperate in juxtaposition to interlock one with the other defining an interface between the first and second members. Clamping means holds the first and second members together at the interface.

DETAILED DESCRIPTION OF THE INVENTION

An advantage of replacing at least a portion of a member of a gas turbine engine, intended for aircraft application, with a relatively lower mass composite material is reduction in weight. Other advantages can include higher shaft stiffness and reduced cost. One example of such a member is a rotating shaft intended to transfer torque from one engine portion to another, such as between a front fan and a low pressure turbine of a gas turbine engine. Permanent bonding, such as by welding, of a fiber reinforced metal matrix composite portion of a rotating shaft to a metal or metal alloy shaft portion of generally uniform structure is not practical, and in some examples cannot be accomplished, for certain shafts of a gas turbine engine. The present invention provides a mechanical coupling that enables the transfer of torque between such cooperating rotating members. In addition, the mechanical arrangement of the invention provides the capability to compensate, in the coupling design, for tolerances associated with differences in thermal expansion characteristics between the cooperating members.

Figure 1:
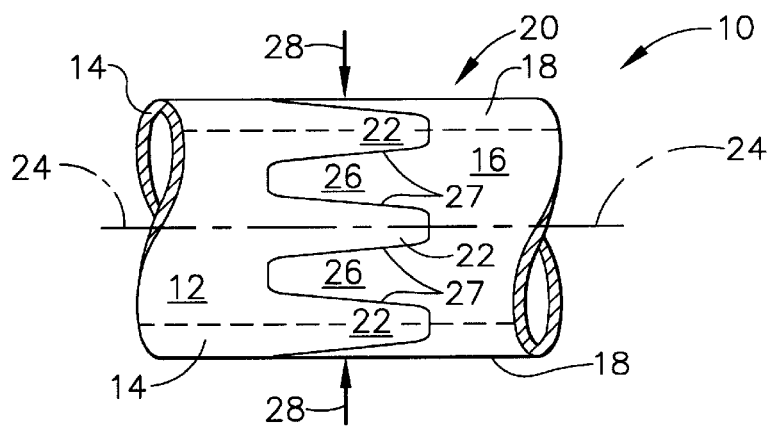
FIG. 1 is a diagrammatic, fragmentary view of a hollow shaft substantially of circular cross section comprising first and second shaft members joined at a radial spline therebetween, according to a form of the present invention.

The present invention will be more fully understood by reference to the drawings. FIG. 1 is a simplified, diagrammatic fragmentary view of a hollow, rotating shaft of substantially circular cross section, shown generally at 10. Shaft 10 comprises a first hollow member 12 with an outer wall 14 and made of silicon carbide fiber reinforced matrix of a commercial Ti base alloy. Other fibers that can be used include graphite, carbon, tungsten, polymer, boron, and glass. Shaft 10 includes a second hollow member 16 with an outer wall 18 and made of a Ni base alloy commercially available as In 718 alloy. Typical examples of metals from which second member 16 can be made include at least one of Fe, Ni, Co, Ti, Al, Mg, and their alloys. Fibers in the matrix of member 12, when oriented generally axially not only provided a member as 12 of about 60% of the weight of the Ni alloy member 16, but also up to about twice the stiffness of member 16.

To provide the mechanical coupling of the present invention, the first and second members 12 and 16, respectively, are disposed interlocking though releasable registry, as shown, in the form of a mechanical radial spline, representing the coupling, shown generally at 20. Spline 20 comprises a first plurality of teeth-like members 22, herein called teeth, circumferentially disposed about first member 12 and projecting from first member 12 generally axially in respect to shaft axis of rotation 24. Spline 20 also includes a second plurality of teeth 26, mechanically to interlocking with first plurality of teeth 22, circumferentially disposed about second member 16 and projecting toward teeth 22 generally axially in respect to shaft axis of rotation 24. Teeth 22 and 26 interlock at radial spline 20 to define an interface 27 between members 12 and 16. Holding the first and second members for rotation together and transfer of torque is a clamping means represented in FIG. 1 as arrows is 28. Forms of such clamping means are shown in FIGS. 2 and 3.

The embodiments of the drawings are presented as hollow shafts because that form is most frequently used in aircraft gas turbines. However, it should be understood that the present invention can be applied to substantially solid type shaft members as well. Examples of hollow shafts have been designed to operate and rotate within a gas turbine engine between the fan section and turbine section of the engine, as is well known in the turbine engine art. As mentioned above, in prior designs such a hollow shaft has been made of a single metal or alloy, or a plurality of cooperating metal and/or alloy members aligned and bonded into a shaft, such as by welding or other fusion bonding.

Figure 2:
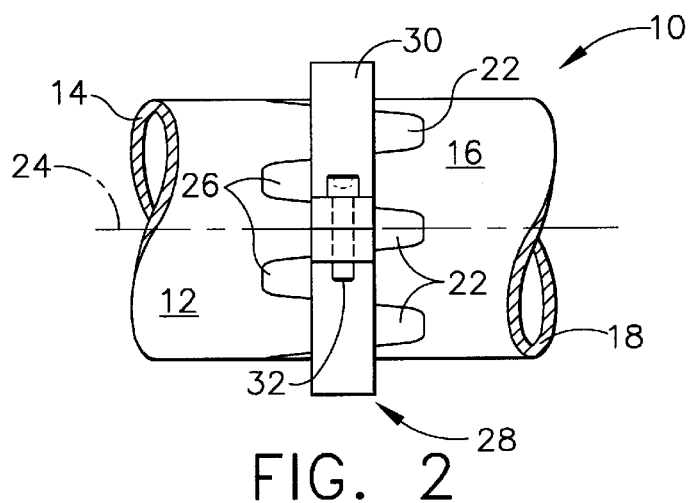
FIG. 2 is a diagrammatic fragmentary view of the shaft of FIG. 1 showing a form of holding means or fastener holding members of the shaft together.

The fragmentary, diagrammatic view of FIG. 2 shows the combination of members of FIG. 1 in which the clamping means 28 included in the mechanical coupling of the present invention is a cap screw fastener including collar 30 about interlocked teeth 22 and 26 of spline 20. Collar 30 is secured about shaft 10 at spline 20 by a screw 32.

Figure 3:
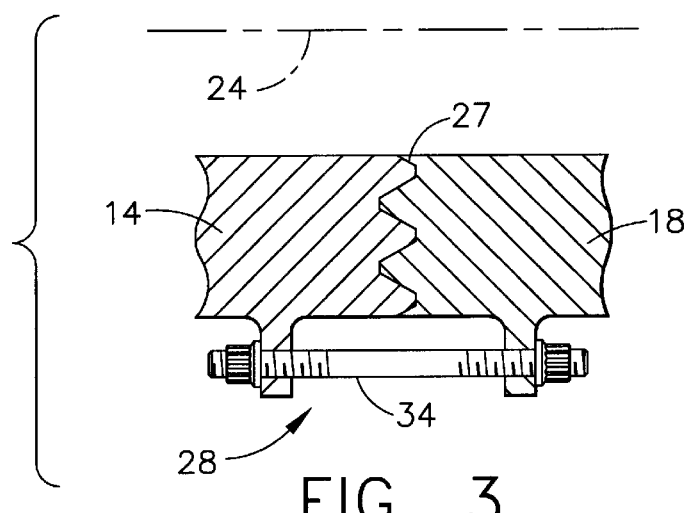
FIG. 3 is a fragmentary, sectional view of another form of holding means.

Another embodiment of clamping means 28 is shown in the fragmentary sectional view of FIG. 3. In that form, walls 14 and 18 are clamped together across interlocking interface 27 by threaded screw 34.

Figure 4:
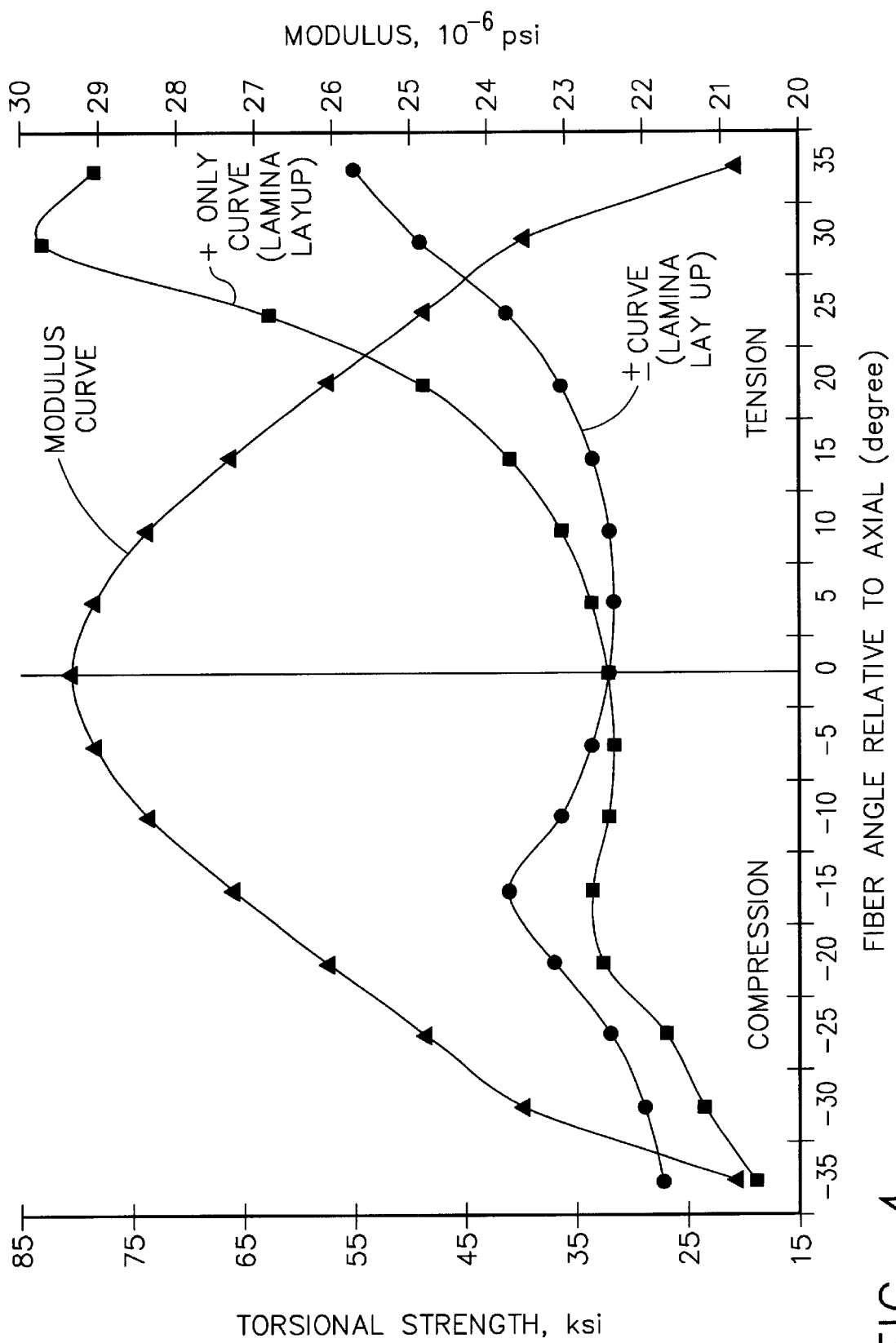
FIG. 4 is a graphical presentation of data comparing torsional strength and modulus with fiber angle of orientation relative to the axial direction or axis of rotation for a Ti metal matrix composite shaft member.

According to embodiments of the present invention, reinforcing fibers in fiber reinforced composite first member 12 are aligned generally along axis of rotation 24 predominantly within about 45°, on either side, of the direction of the axis of rotation. The presentation of FIG. 4 includes data from a graphical comparison of torsional strength and modulus with fiber angle relative to axial for a fiber reinforced composite. The matrix of the composite was a commercial Ti base alloy, for example Ti 6-4 alloy and Ti 6-2-4-2 alloy. The reinforcing fibers were silicon carbide. The data of FIG. 4 show that the torsional strength and modulus preferred for the coupling of the present invention is attained when the fibers are aligned within about 45°, on either side, of axial. According to a form of the present invention, fiber angle was selected to satisfy torque and stiffness requirements. Fibers predominantly in the longitudinal direction provided the highest stiffness. The highest torque capability was achieved with fibers at about 45° to the axis of rotation.

Figure 5:
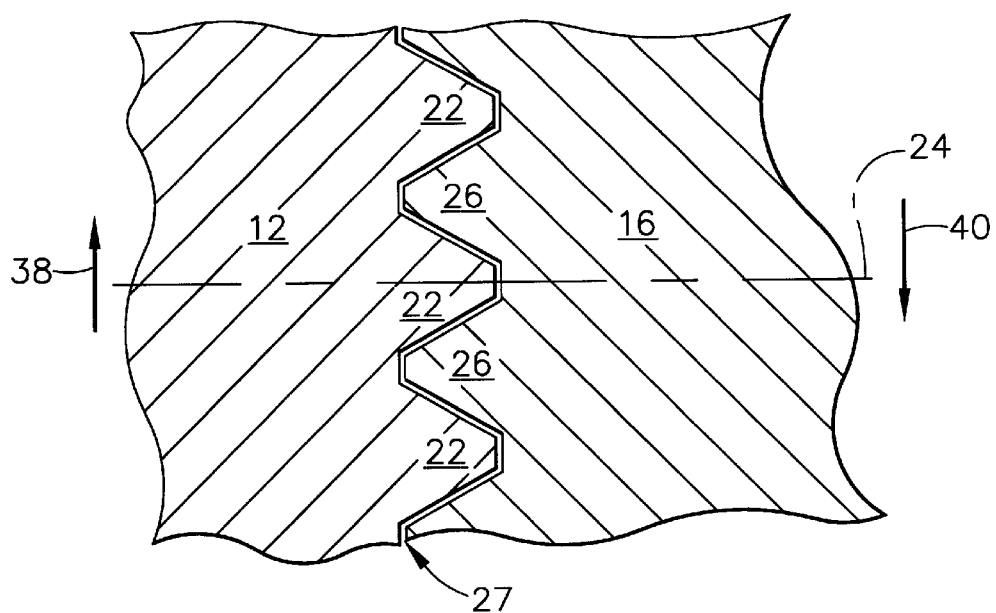
FIG. 5 is an enlarged, fragmentary sectional view of a portion of the radial spline of the type shown in FIG. 1.

FIG. 5 is an enlarged fragmentary sectional view of a portion of the interlocked members of FIG. 1. Teeth 22 and 26 are releasably interlocked mechanically at interface 27 between members 12 and 16, respectively. Shown in FIG. 5 are reinforcing fibers 26, aligned generally along axis of rotation 24. Arrows 38 and 40 show the direction of torque respectively for members 12 and 16.

Figure 6:
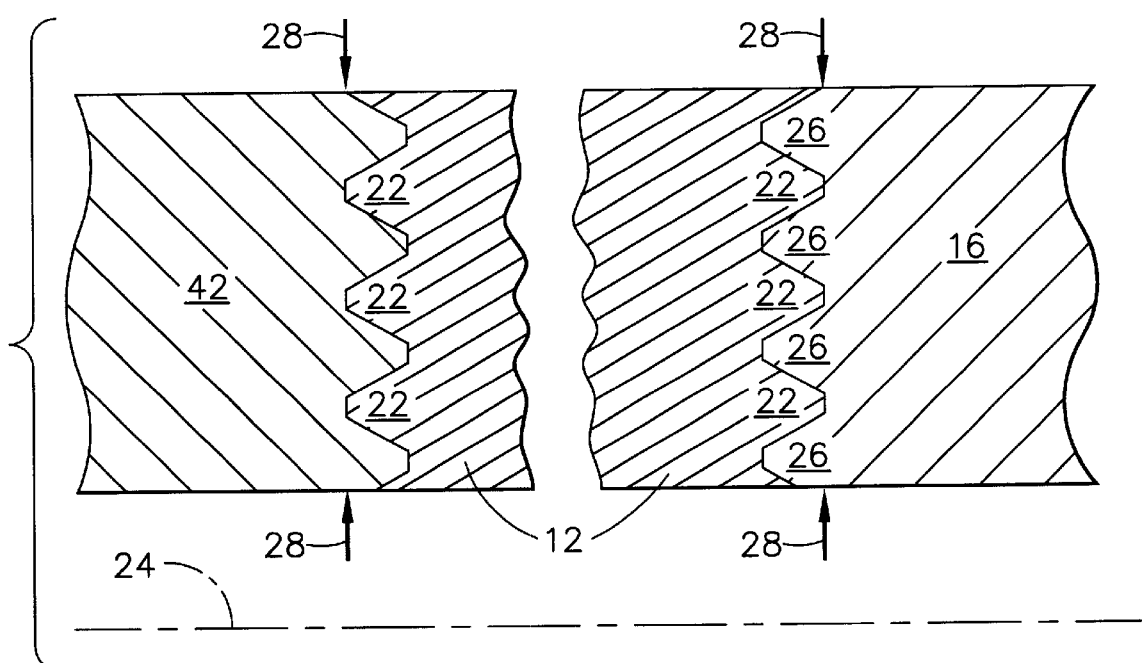
FIG. 6 is a fragmentary, sectional view of another form of the mechanical coupling of present invention.

FIG. 6 is a fragmentary sectional view of a wall of another embodiment of the present invention in which a fiber reinforced first member 12 is mechanically coupled at teeth 22, as described above. In this example, first member 12 is interlocked between cooperating second member 16 and a third member 42 including teeth 44. Each of members 16 and 42 is made of a metal or metal alloy generally of uniform structure. The mechanical coupling is held by clamping means 28, for example as described above.

The present invention has been described in connection with specific examples and embodiments that are intended to be typical of rather than in any way limiting on its scope. For example, forms of the mechanical coupling of the present invention can be used at any joint in which it is intended to transform torque into a cylindrical form. Those skilled in the art will understand that the invention is capable of variations and modifications without departing from the scope of the appended claims.

What is claimed is:

1. A mechanical coupling to transfer torque between cooperating rotatable members, each of substantially circular cross section and aligned along an axis of rotation, the coupling comprising:

a first member having a first surface portion of a fiber reinforced composite material including fibers oriented predominantly within about 45°, on either side, of the axis of rotation;

the first surface portion including a first plurality of spaced apart teeth projecting from the first surface portion;

a second member having a second surface portion including a second plurality of spaced apart teeth projecting from the second surface portion toward the first plurality of teeth;

the first and second plurality of teeth cooperating in juxtaposition to interlock mechanically one with the other defining an interface between the first and second members; and, clamping means to hold the first and second members together at the interface.

2. The mechanical coupling of claim 1 in which:

the first plurality of teeth project generally axially and are disposed generally circumferentially about the first member; and, the second plurality of teeth project generally axially and are disposed generally circumferentially about the second member.

3. The mechanical coupling of claim 1 in which the first surface portion of the first member is a fiber reinforced metal matrix composite material comprising the fibers in a metal matrix.

4. The mechanical coupling of claim 3 in which:

the metal matrix is based on Ti; and the fibers are at least one selected from the group consisting of silicon carbide, graphite, carbon, tungsten, polymer, boron and glass.

5. The mechanical coupling of claim 4 in the form of a turbine engine shaft in which the second portion of the second member is made of at least one metal selected from the group consisting of Fe, Ni, Co, Ti, Al, Mg, and their alloys.

6. A rotatable gas turbine engine shaft of substantially circular cross section comprising the mechanical coupling of claim 1, including the first member and the second member of the mechanical coupling, the first member and the second member each being of substantially circular cross section, the first and second members secured to rotate in registry together through the mechanical coupling.

7. The shaft of claim 6 in which:

the first member is hollow and is a fiber reinforced metal matrix composite material comprising fibers in a metal matrix, in which the metal matrix is based on Ti and the fibers are at least one selected from the group consisting of silicon carbide, graphite, carbon, tungsten, polymer, boron, and glass; and, the second member is hollow and is made of at least one metal selected from the group consisting of Fe, Ni, Co, Ti, Al, Mg and their alloys.

8. In a method for making the mechanical coupling of claim 1, including the first member and the second member of the mechanical coupling, the steps of:

selecting the fiber reinforced composite material for the first member;

selecting a metal for the second member;

selecting torque and stiffness requirements for the coupling;

measuring and comparing, for the fiber reinforced composite material, the torsional strength and modulus with fiber angle to provide comparison data; and then, selecting from the comparison data a fiber angle within about 45° of the axis of rotation for the fiber in the composite material for the first member to satisfy the torque and stiffness requirements for the coupling.

9. The method of claim 8 for making a rotatable gas turbine engine shaft of substantially circular cross section comprising the first member and the second member each being of substantially circular cross section, the first and second members secured to rotate in registry together through the mechanical coupling, wherein:

the fiber reinforced composite material of the first member comprises the fibers in a metal matrix based on Ti;

the fibers of the fiber reinforced composite material of the first member are at least one selected from the group consisting of silicon carbide, graphite, carbon, tungsten, polymer, and glass; and, the second member is made of at least one metal selected from the group consisting of Fe, Ni, Co, Ti, Al, Mg and their alloys.

* * * * *